(12) United States Patent
Chabaud

(10) Patent No.: US 12,288,056 B2
(45) Date of Patent: Apr. 29, 2025

(54) METHOD FOR DESIGNING A FIRMWARE, FIRMWARE OBTAINED BY SUCH A METHOD AND METHOD FOR MODIFYING SUCH A FIRMWARE

(71) Applicant: BULL SAS, Les Clayes-sous-Bois (FR)

(72) Inventor: Florent Chabaud, Paris (FR)

(73) Assignee: BULL SAS, Les Clayes-sous-Bois (FR)

( * ) Notice: Subject to any disclaimer, the term of this patent is extended or adjusted under 35 U.S.C. 154(b) by 34 days.

(21) Appl. No.: 18/185,339

(22) Filed: Mar. 16, 2023

(65) Prior Publication Data

US 2023/0315432 A1 Oct. 5, 2023

(30) Foreign Application Priority Data

Mar. 30, 2022 (EP) .................................... 22305405

(51) Int. Cl.
*G06F 8/654* (2018.01)
*G06F 8/30* (2018.01)
*G06F 8/65* (2018.01)
*G06F 8/71* (2018.01)
*G06F 9/4401* (2018.01)
*G06F 9/445* (2018.01)
*G06F 11/14* (2006.01)
*G06F 21/57* (2013.01)
*H04L 29/06* (2006.01)

(52) U.S. Cl.
CPC .................. *G06F 8/65* (2013.01); *G06F 8/30* (2013.01); *G06F 8/71* (2013.01)

(58) Field of Classification Search
CPC ..... G06F 8/65; G06F 8/30; G06F 8/71; G06F 8/654; G06F 8/658; G06F 11/0757; G06F 11/1433; G06F 21/572; G06F 9/5061; G06F 9/4451; G06F 11/0793; H04L 9/3247; H04L 9/0891
See application file for complete search history.

(56) References Cited

U.S. PATENT DOCUMENTS

| | | | |
|---|---|---|---|
| 8,745,612 B1 | 6/2014 | Semenzato et al. | |
| 11,861,349 B2* | 1/2024 | Suryanarayana | ......... G06F 8/65 |
| 2008/0243862 A1* | 10/2008 | Pathak | ...................... G06F 8/60 |
| 2020/0019397 A1 | 1/2020 | Duran et al. | |
| 2020/0349009 A1* | 11/2020 | Samuel | ............... G06F 11/1469 |
| 2022/0374244 A1* | 11/2022 | Wu | ......................... G06F 9/445 |
| 2023/0112734 A1* | 4/2023 | Suryanarayana | ..... H04L 9/3247 |
| | | | 717/170 |

OTHER PUBLICATIONS

European Search Report and Written Opinion issued in EP22305405.7 dated Sep. 14, 2022 (5 pages).

* cited by examiner

*Primary Examiner* — Thuy Dao
(74) *Attorney, Agent, or Firm* — ARC IP Law, PC; Joseph J. Mayo

(57) ABSTRACT

The invention relates to a computer implemented method for designing a firmware including writing the firmware version, and providing the firmware version with a version data identifying the firmware version. The method also includes providing the firmware version with a second data, called rollback data, the second data provided to be compared to the version data of other versions of the firmware, and authorizing, and indicating a limit for, older firmware versions to which the firmware may be downgraded. The invention further relates to a firmware obtained by such a method and a method for modifying the version of a firmware installed on a platform and designed by such a method.

16 Claims, 2 Drawing Sheets

METHOD FOR DESIGNING A FIRMWARE, FIRMWARE OBTAINED BY SUCH A METHOD AND METHOD FOR MODIFYING SUCH A FIRMWARE

This application claims priority to European Patent Application Number 22305405.7, filed 30 Mar. 2022, the specification of which is hereby incorporated herein by reference.

BACKGROUND OF THE INVENTION

Field of the Invention

At least one embodiment of the invention relates to a computer implemented method for designing a firmware. One or more embodiments of the invention further relates to a firmware obtained by such a method and a method for modifying the version of firmware designed by such a method.

The field of the invention is the field of designing and modifying firmware.

Description of the Related Art

In computing, firmware is a specific class of computer software that provides the low-level control for a device's specific hardware, also called platform in the application. For complex platforms, such as a computer, the firmware may contain basic functions allowing hardware abstraction for other software, such as an operating system of the platform. In less complex platforms, such as remote, the firmware may act as the operating system of the device. To ensure integrity of the platform on which the firmware is to be installed, the firmware is signed, for example a hash value of the firmware is signed by a cryptographic key.

When a vulnerability is detected, the firmware of a platform may be updated by installing a new version of the firmware. To prevent a rollback of the firmware to a previous vulnerable version, an anti-rollback feature is mandatory. A well-known anti-rollback feature consists in incrementing the version number of the firmware and preventing an installation that decreases the firmware version. In other words, before installation of a new version of the firmware, its version number is checked to ensure that it is newer than the version number of the currently installed version of the firmware. If not, the installation of the new version of the firmware is not authorized.

But this anti-rollback solution is not suited for agile developments. It prevents to come back to the previous version of the firmware, when a new version of the firmware installed on a platform is buggy. In such a situation, it is mandatory to sign the previous version of the firmware with a new version number in order to be able to revert to the previous version: this increases the number of versions. Plus, this solution is time-consuming and cumbersome not to mention other threats it may cause.

A purpose of at least one embodiment of the invention is to overcome at least one of these drawbacks.

Another purpose of at least one embodiment of the invention is to provide a more agile and flexible solution for firmware modification.

Another purpose of one or more embodiments of the invention is to provide a solution for firmware modification that may be used to revert to an older version of the firmware, in a controlled way.

Another purpose of one or more embodiments of the invention is to provide a solution for firmware modification that is more autonomous.

BRIEF SUMMARY OF THE INVENTION

At least one embodiment of the invention makes it possible to achieve at least one of these aims by a computer implemented method for designing a firmware version, comprising the following steps:
  writing said firmware version, and
  providing said firmware version with a version data identifying said firmware version;
wherein the method also comprises a step for providing the firmware version with a second data, called rollback data:
  provided to be compared to the version data of other versions of said firmware, and
  authorizing, and indicating a limit for, older firmware versions to which said firmware may be downgraded to.

The rollback data associated to the firmware version authorizes a controlled rollback of the firmware version to an older version. For example, in at least one embodiment, the rollback data of a current firmware version installed on a platform is compared to the version data of another firmware version that is older than the said current version. If the version data of said older firmware version is satisfactory when compared to the rollback data, then the said older firmware version is authorized to be installed instead of said current version.

Thus, a firmware designed according to one or more embodiments of the invention allows downgrading of a firmware version installed on a platform, i.e. a rollback of the firmware installed on a platform, without being obliged to create a new version number for an older version and signing it. The solution proposed by at least one embodiment of the invention is thus less time-consuming and less cumbersome compared to the solutions proposed in the state of the art. Plus, in at least one embodiment, the downgrading of the firmware is easier and faster with the solution proposed by one or more embodiments of the invention.

Moreover, by way of at least one embodiment of the invention, more agile developments are possible. For example, it is possible to test a new version of the firmware on a platform and revert to an older version, for example when the new version is buggy, or when optimization of the new version is needed.

In addition, in one or more embodiments, the downgrading of the firmware version is based on data that are part of the firmware. In other words, there is no need for an external reference such as an external time reference or a trusted third party. Thus, the solution of at least one embodiment of the invention is very light and autonomous to implement.

In one or more embodiments, "downgrading" means a rollback of a firmware installed on a platform to a previous version compared to the one installed on said platform.

"Platform", in at least one embodiment, means any computerized apparatus, device or component, such as a server, a computer, a tablet, a Smartphone, an integrated board, a processor, a chip, etc. on which a firmware may be installed.

According to one or more embodiments, the rollback data may be incorporated into the firmware version before signing said firmware version, so that it is part of the signed data of said firmware version.

This provides more security to the rollback data, and prevent said rollback data from being corrupted by malevolent behavior.

More particularly, in at least one embodiment, the rollback data may be inserted in a header of the firmware version.

According to one or more embodiments, the rollback data may comprise a version number indicating a firmware version number limit for the firmware versions to which the firmware may be downgraded to.

For example, in at least one embodiment, the rollback data may indicate the most older firmware version to which the firmware may be downgraded to.

According to at least one embodiment, for sake of security, the rollback data may indicate the most recent older version that is fully functional in order to avoid a too important downgrading of the firmware.

According to at least one embodiment, the rollback data may indicate the number of the current version of the firmware. Thus, when a new version is installed it is readily possible to downgrade to said current version.

According to one or more embodiments, the rollback data may comprise a time data indicating a time limit for the firmware versions to which the firmware may be downgraded to.

In particular, in at least one embodiment, the rollback data may be a timestamp, indicating the date of said firmware version.

The timestamp may be generated by using the time provided by an external clock.

The timestamp may be generated by using the POSIX time format.

According to at least one embodiment, for sake of security, the rollback data may be the timestamp of the most recent older version that is fully functional in order to avoid a too important downgrading of the firmware.

According to at least one embodiment, the rollback data may be the timestamp of the current version of the firmware. Thus, when a new version is installed it is readily possible to downgrade to said current version.

According to one or more embodiments, the version data may be incorporated into the firmware version before signing the firmware version, so that said version data is part of the signed data of said firmware version.

Thus, in at least one embodiment, the version data is more protected against malevolent behavior. Indeed, if a malevolent activity modifies the version data it will be easily detected with the signature of the firmware version.

More particularly, in at least one embodiment, the version data may be inserted in a header of the firmware version.

According to one or more embodiments, the version data of the firmware version may comprise a version number of said firmware version.

In one or more embodiments, the version data may comprise a time data.

In particular, in at least one embodiment, the version data may be a timestamp, indicating the date of said firmware version.

The timestamp may be generated by using the time provided by an external clock.

The timestamp may be generated by using the POSIX time format.

According to one or more embodiments of the invention, it is proposed a non-transient firmware designed by the method according to at least one embodiment.

The firmware may be designed in any programming language.

The firmware may be in a machine language, or in a programming language, such as C, C++, assembly, etc.

The firmware may be stored, in a non-transient memory, local or distant, such as a USB stick, a flash memory, a hard disc, a processor, a programmable electronic chip, a computer, a server, on the cloud, etc.

In one or more embodiments, the firmware may include:
- a part comprising, or consisting in, a header of the firmware;
- a part comprising, or consisting in, a payload of the firmware; and
- a part comprising, or consisting in, a signature zone comprising a signature of the firmware.

The rollback data may be registered in the header of the firmware.

The version data may be registered in the header of the firmware.

According to at least one embodiment of the invention it is proposed, a computer implemented method for replacing a first firmware version installed on a platform by a second firmware version, each of the firmware versions being designed by the method according to one or more embodiments of the invention, the method including:
- comparing a version data of the second firmware version to the rollback data of the first firmware version, and
- when the comparison indicates that the second firmware version is not older than the limit indicated by the rollback data, authorizing an installation process of the second firmware version instead of the first firmware version;
- in the contrary, preventing the installation of the second firmware version instead of the first firmware version.

Thus, the method according to one or more embodiments the invention allows a secure rollback of a firmware installed on a platform.

Of course, in one or more embodiments, additional controls may be implemented to fully authorize, or to inform user regarding, the installation of an older version of the firmware compared to the current version.

In one or more embodiments, the method according to the invention may also comprise a step for:
- comparing the version data of the second firmware version to the rollback data of said second firmware version, and
- if the comparison indicates that said version data is older than said rollback data,
  - preventing the installation process of said second firmware version, and
  - optionally, generating a warning indicating that the second firmware version is corrupted.

Indeed, by way of at least one embodiment, if the rollback data of the second firmware version is not older than the version data of said second firmware version, then it is very likely that the firmware is corrupted either by malevolent behavior or pursuant to an error.

In one or more embodiments, the method according to the invention may also comprise a step for:
- comparing the version data of the second firmware version to the version data of the first firmware version, and
- if the comparison indicates that said second firmware version is older said first firmware version, generating a warning indicating a downgrade of the firmware to an older version.

Thus, by way of at least one embodiment, the user is informed that the installation of the second version is a rollback. Such a warning prevents the user from a non-intentional downgrade, or from an erroneous manipulation.

In one or more embodiments, the method according to the invention may also comprise a step for:
comparing the rollback data of the second firmware version to the rollback data of the first firmware version, and
if the comparison indicates that the rollback data of the second firmware version is older than the rollback data of the first firmware version, generating a warning indicating that the downgrading is relaxed.

In this case, the rollback may not be prevented. But the user may be informed by the warning that the installation of the second firmware version will give the possibility to a more important rollback.

In one or more embodiments, the method according to the invention may also comprise a step for:
comparing the rollback data of the second firmware version to a predetermined value; and
when the rollback data of the second firmware version is equal to said predetermined value, generating a warning indicating that anti-downgrading feature is disabled.

Indeed, by way of at least one embodiment, it is possible to use a predetermined value to disable the anti-downgrading feature, i.e. to authorize any rollback of the firmware, such that if the rollback data is set to said predetermined value, then any older firmware version may be installed on the platform.

The predetermined value may be 0 (zero), or 1 (one) or any other value.

BRIEF DESCRIPTION OF THE DRAWINGS

Other advantages and characteristics will become apparent on examination of the detailed description of at least one embodiment of the invention which is in no way limitative, and the attached figures, where.

BRIEF DESCRIPTION OF THE INVENTION

It is well understood that the one or more embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the invention with respect to the prior art.

In the FIGURES, elements common to several figures retain the same reference.

Figure 1:
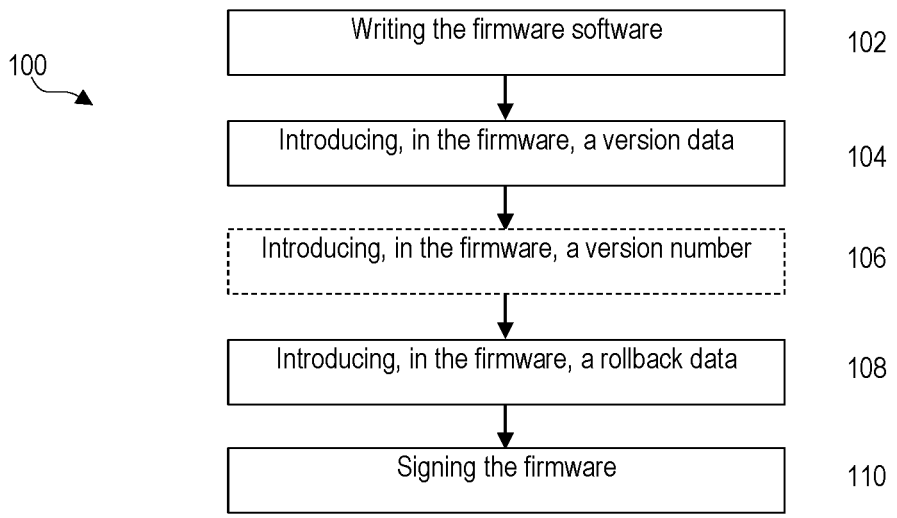
FIG. 1 is a diagrammatic representation of a method according to one or more embodiments of the invention for designing a firmware.

FIG. 1 is a diagrammatic representation of a method according to one or more embodiments of the invention for designing a firmware.

The method 100, shown in FIG. 1, may be used to design any version of a firmware, including the first version of the firmware. The firmware may be the firmware of any kind of computerized platform such as a server, a computer, a tablet, a Smartphone, an electronic device such as a remote, a phone, an electric board comprising at least one electronic component, an electronic component such as a processor, a chip, etc.

The method 100 comprises a step 102 during which the firmware is written, either by a human activity or by an automated firmware generator. The firmware may be written in any kind of programming language such as Assembly, C, C++, etc. In most cases, the written firmware comprises a header, a payload and a signature zone.

At a step 104 a version data is written in the firmware, and more particularly in the header of the firmware.

The version data may be a version number. Alternatively, in one or more embodiments, the version data may be a timestamp generated before, or at, the time of signing the firmware. In this case the version data is not a version number.

When the version data is a timestamp, the latter may be generated with reference to an external time source. For example, the timestamp may be generated with reference to POSIX time format.

The version data may be written in the header zone of the firmware and so that the version data is part of the signed firmware data.

Optionally, by way of at least one embodiment, in case the version data is not the version number, a version number may be written in the firmware, at an optional step 106. Traditionally, the version number may be written in the header of the firmware.

At a step 108 a rollback data is written in the firmware, and more particularly in the header of the firmware.

The rollback data is provided to be compared to the version data of an older firmware version to determine whether said older firmware version may be installed instead of this version of the firmware. In other words, by way of at least one embodiment, the rollback data is provided to be compared to the version data of an older firmware version in order to determine whether a rollback, or a downgrade, is authorized from this firmware version to the older firmware version.

The rollback data may be a version number. Alternatively, in one or more embodiments, the rollback data may be a timestamp.

The rollback data indicates the older version(s) of the firmware that are authorized to be installed instead of this version the firmware. Thus the rollback data authorizes a rollback, or a downgrade, of the firmware to an older version compared to this version of the firmware. In one or more embodiments, the rollback data may be chosen to completely forbid the use of older versions and force the upgrade to a newer version.

For example, in at least one embodiment, the rollback data may indicate the most older version of the firmware authorized to be installed instead of this version of the firmware. When the version data is a timestamp, then the rollback data may be the timestamp of said most older version authorized to be installed instead of this version of the firmware.

At any rate, by way of at least one embodiment, the rollback data and the version data are the same type of data, i.e. either version numbers or timestamps.

The method 100 may also comprise a step 110 for signing the firmware. The signing process may comprise a hash value of the data of the firmware including the header and the payload of the firmware. Of course, other signing methods may be used.

The signature of the firmware may be written in a signature zone of the firmware.

Figure 2:
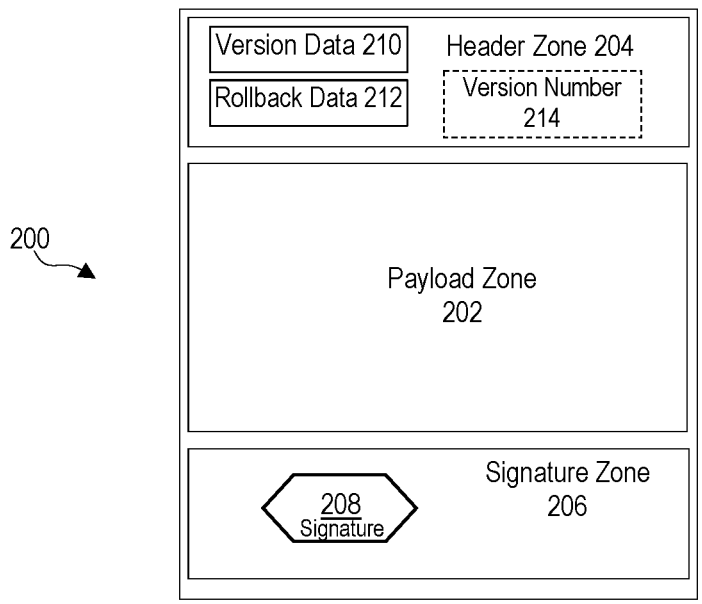
FIG. 2 is a diagrammatic representation of a firmware according to one or more embodiments of the invention.

FIG. 2 is a diagrammatic representation of a firmware according to one or more embodiments of the invention.

The firmware 200 may be obtained by a method according to one or more embodiments of the invention for designing a firmware, and more particularly by the method 100 of the FIG. 1.

The firmware 200 comprises a payload zone 202 comprising the instructions for implementing the functions of the firmware on a platform.

The firmware 200 also comprises a header zone 204 comprising information relating/regarding/identifying the firmware.

The firmware 200 also comprises a signature zone 206 comprising a signature 208 of the firmware.

The firmware 200 also comprises a version data 210, and a rollback data 212, written in the header zone 204 of the firmware 200. Thus the version data 210 and the rollback data 212 are part of the signed data of the firmware. In other words, the signature 208 takes into account the version data et the rollback data.

Optionally, by way of at least one embodiment, when the version data is not a version number, the firmware may comprise a version number 214 written in the header of the firmware.

Of course, the firmware may comprise other data that are not described here.

Figure 3:
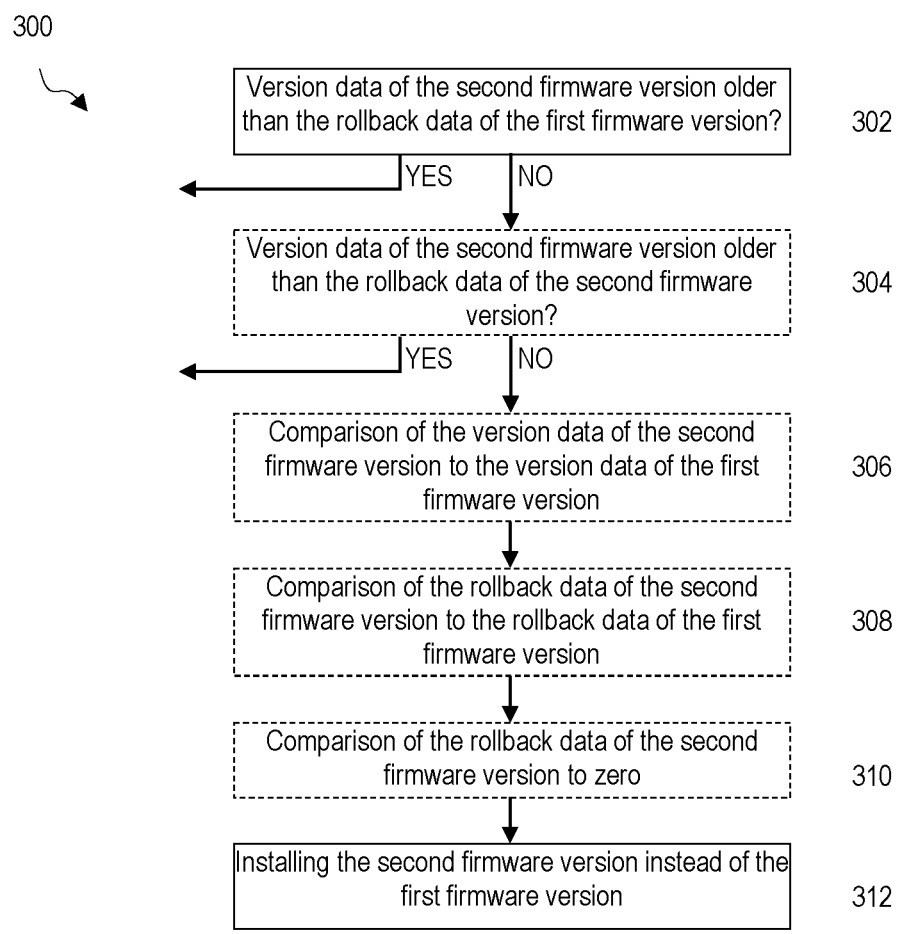
FIG. 3 is a diagrammatic representation of a method according to one or more embodiments of the invention for modifying a firmware installed on a platform.

FIG. 3 is a diagrammatic representation of a method according to one or more embodiments of the invention for modifying a firmware on a platform.

More particularly, by way of at least one embodiment, the method 300 may be used to replace a first firmware version, currently installed on a platform, by a second firmware version, older than the first firmware version. Both firmware versions are designed according to the invention, and more particularly according to the method 100 of FIG. 1. That means that each of the firmware versions comprises a version data and a rollback data.

The method 300 comprises a first step 302 comparing the version data of said second firmware version with the rollback data of the first firmware version. If the version data of the second firmware version is older than the rollback data of the first firmware version, then a rollback to the second firmware version is not authorized and the method 300 is stopped.

In at least one embodiment, the method 300 continues to an optional step 304 comparing the version data of the second firmware version to the rollback data of said second firmware version. If the comparison indicates that said version data is older than said rollback data, the installation of the second firmware version is prevented because the second firmware version is corrupted. Optionally a warning may be generated indicating that the second firmware version is corrupted In at least one embodiment, the method 300 continues to an optional step 306 comparing the version data of the second firmware version to the version data of the first firmware version. If, the comparison indicates that the version data of the second firmware version is not older than the version data of the first firmware, then it means that the replacement of the first version by the second version is not a rollback and the installation of the second version is authorized. In at least one embodiment, the replacement of the first version by the second version is a rollback and a warning may be generated indicating a downgrade of the firmware to an older version.

At any rate, the method 300 continues to an optional step 308 comparing the rollback data of the second firmware version to the rollback data of the first firmware version. If the rollback data of the second firmware version is older than the rollback data of the first firmware data, a warning may be generated to indicate that the downgrading is relaxed.

The method then continues to an optional step 310 comparing the rollback data of the second firmware version to zero. If, the rollback data of the second firmware version is equal to zero, step 310 may generate a warning indicating that anti-downgrading feature is disabled. Indeed, if the rollback data is set to zero, then any older firmware version may be installed on the platform.

Finally, the second firmware version is installed at a step 312 instead of the first firmware version. The firmware on the platform has been downgraded.

Of course, by way of one or more embodiments, the method 300 may comprise other verifications than those indicated here. For example, the method 300 may comprise a step checking the integrity of the second firmware version by checking the signature of the second firmware version.

Moreover, the method 300 may not comprise at least one of the steps indicated as optional.

Of course, one or more embodiments of the invention are not limited to the examples detailed above.

What is claimed is:

1. A computer implemented method for designing a firmware version of a firmware, comprising:
   writing said firmware version;
   providing said firmware version with a version data identifying said firmware version;
   providing said firmware version with rollback data, wherein said providing said firmware version with the rollback data comprises
      comparing said firmware version to version data of other versions of said firmware, and
      authorizing and indicating a limit for older firmware versions to which said firmware may be downgraded to;
   wherein the rollback data is incorporated into the firmware version before signing said firmware version, wherein said rollback data is incorporated into a header of said firmware version, such that said rollback data is part of signed data of said firmware version.

2. The computer implemented method according to claim 1, wherein the rollback data comprises a version number indicating a firmware version number limit for the older firmware versions to which the firmware may be downgraded to.

3. The computer implemented method according to claim 1, wherein the rollback data comprises a time data indicating a time limit for the older firmware versions to which the firmware may be downgraded to.

4. The computer implemented method according to claim 3, wherein the version data is incorporated into the firmware version before signing the firmware version, wherein the header of said firmware version is incorporated into the firmware version, such that said version data is part of the signed data of said firmware version.

5. The computer implemented method according to claim 1, wherein the version data of the firmware version comprises a version number of said firmware version.

6. The computer implemented method according to claim 1, wherein the version data of the firmware version comprises a time data comprising a timestamp, wherein said time data indicates a date of said firmware version.

7. A firmware version stored in a memory designed by a computer implemented method for designing said firmware version of a firmware, said computer implemented method comprising:
 writing said firmware version;
 providing said firmware version with a version data identifying said firmware version;
 providing said firmware version with a second data comprising rollback data, wherein said providing said firmware version with the second data comprises
  comparing said firmware version to the version data of other versions of said firmware, and
  authorizing and indicating a limit for older firmware versions to which said firmware may be downgraded to;
 wherein the rollback data is incorporated into the firmware version before signing said firmware version, wherein said rollback data is incorporated into a header of said firmware version, such that said rollback data is part of signed data of said firmware version.

8. A computer implemented method for replacing a first firmware version of a firmware installed on a platform by a second firmware version, said computer implemented method comprising:
 writing said first firmware version and said second firmware version; providing said first firmware version with a first version data identifying said first firmware version;
 providing said second firmware version with a second version data identifying said second firmware version;
 providing each of said first firmware version and said second firmware version with rollback data, wherein said providing said each of said first firmware version and said second firmware version with the rollback data comprises
  comparing said first firmware version to version data of other versions of said first firmware version,
  authorizing and indicating a limit for older first firmware versions to which said first firmware version may be downgraded to;
  comparing said second firmware version to version data of other versions of said second firmware version,
  authorizing and indicating a limit for older second firmware versions to which said second firmware version may be downgraded to;
 comparing the second version data of said second firmware version to the rollback data of the first firmware version, and
  when the comparing the second version data of said second firmware version indicates that the second firmware version is not older than the limit indicated by said rollback data, authorizing an installation of said second firmware version instead of said first firmware version;
  when the comparing the second version data of said second firmware version indicates that the second firmware version is older than the limit indicated by said rollback data, preventing the installation of said second firmware version instead of said first firmware version.

9. The computer implemented method according to claim 8, further comprising
 comparing the second version data of the second firmware version to the rollback data of said second firmware version, and
  when the comparing the second version data of the second firmware version indicates that said second version data is older than said rollback data of said second firmware version,
   preventing the installation of said second firmware version, and
   optionally, generating a warning indicating that the second firmware version is corrupted.

10. The computer implemented method according to claim 8, further comprising
 comparing the second version data of the second firmware version to the first version data of the first firmware version, and
 when the comparing the second version data of the second firmware version indicates that said second firmware version is older than said first firmware version, generating a first warning indicating a downgrade of the firmware to an older version.

11. The computer implemented method according to claim 10, further comprising
 comparing the rollback data of the second firmware version to the rollback data of the first firmware version, and
 when the comparing the rollback data of the second firmware version indicates that the rollback data of the second firmware version is older than the rollback data of the first firmware version, generating a second warning indicating that the downgrade of the firmware is relaxed.

12. The computer implemented method according to claim 11, further comprising
 comparing the rollback data of the second firmware version to a predetermined value, and
 when the rollback data of the second firmware version is equal to said predetermined value, generating a third warning indicating that an anti-downgrading feature is disabled.

13. A computer implemented method for designing a firmware version of a firmware, comprising:
 writing said firmware version;
 providing said firmware version with a version data identifying said firmware version;
 providing said firmware version with rollback data, wherein said providing said firmware version with the rollback data comprises
  comparing said firmware version to version data of other versions of said firmware, and
  authorizing and indicating a limit for older firmware versions to which said firmware may be downgraded to,
 wherein the rollback data comprises a time data indicating a time limit for the older firmware versions to which the firmware may be downgraded to.

14. The computer implemented method according to claim 13, wherein the version data is incorporated into the firmware version before signing the firmware version, wherein a header of said firmware version is incorporated into the firmware version, such that said version data is part of signed data of said firmware version.

15. A firmware version stored in a memory designed by a computer implemented method for designing said firmware version of a firmware, said computer implemented method comprising:
 writing said firmware version;
 providing said firmware version with a version data identifying said firmware version;

providing said firmware version with a second data comprising rollback data, wherein said providing said firmware version with the second data comprises
comparing said firmware version to the version data of other versions of said firmware, and
authorizing and indicating a limit for older firmware versions to which said firmware may be downgraded to;
wherein the rollback data comprises a time data indicating a time limit for the older firmware versions to which the firmware may be downgraded to.

16. The firmware version stored in a memory designed by a computer implemented method according to claim 15, wherein the version data is incorporated into the firmware version before signing the firmware version, wherein a header of said firmware version is incorporated into the firmware version, such that said version data is part of the signed data of said firmware version.

\* \* \* \* \*